Patented Nov. 18, 1952

2,618,568

UNITED STATES PATENT OFFICE 2,618,568

SELF-EXTINGUISHING CELLULOSE ACETATE MOLDING COMPOSITIONS

Lester W. A. Meyer and William M. Gearhart, Kingsport, Tenn., assignors to Eastman Kodak Company, Rochester, N. Y., a corporation of New Jersey No Drawing. Application September 16, 1949, Serial No. 116,204

3 Claims. (Cl. 106—177)

This invention relates to cellulose acetate plastic compositions, and more particularly to cellulose acetate compositions which are self-extinguishing when ignited, and which are sufficiently stable at high temperatures to permit of being molded without decomposition of any of the components.

Cellulose acetate compositions plasticized with the usual cellulose acetate plasticizers, such, for instance, as the lower alkyl phthalates, are not suitable for many applications which require a high degree of flame resistance. Triphenyl phosphate in high proportions has been used as a flame-proofing agent, but, although it reduces the flammability somewhat, the resulting compositions are not self-extinguishing. Moreover, the triphenyl phosphate exudes readily in softer flows of the plastic. From time to time various fillers, such, for instance, as antimony oxide, have been proposed as flame-proofing agents in cellulose acetate plastics, but none has proved very successful. It has been known that tri-monochloroethyl phosphate plasticizes and reduces the flammability of cellulose acetate, but it has not hitherto been possible to mold cellulose acetate compositions containing tri-monochloroethyl phosphate.

Tri-monochloroethyl phosphate has a high degree of solvent power for cellulose acetate, and a mixture of the two substances will readily mill into a clear sheet. However, if the tri-monochloroethyl phosphate is used as the sole plasticizer with cellulose acetate, in the amounts in which plasticizers are usually used to obtain the commercial flow range (25 to 50 parts of plasticizer per 100 parts of cellulose acetate by weight), the resulting plastics are found to be somewhat too brittle for injection molding. This brittleness can be appreciably diminished by the addition of other plasticizers, but care must be taken that the excellent flame-proofing properties of the tri-monochloroethyl phosphate are not diminished by the other plasticizer. Most useful plasticizers in this respect are other phosphates, such as triphenyl phosphate, tricresyl phosphate, and tributyl phosphate, which in themselves have some flame-proofing qualities. Other known plasticizers, such, for instance, as the dialkyl phthalates, the sulfonamides, and the ethoxyethyl esters of adipic and sebacic acids, may be used, but it is then necessary to use larger quantities of tri-monochloroethyl phosphate than when another phosphate is used as co-plasticizer.

The problem of stabilizing the tri-monochloroethyl phosphate without sacrificing the desired qualities of the plastic is more difficult. Tri-monochloroethyl phosphate is not as inherently stable to heat at molding temperatures as are the commonly used plasticizers. This instability to heat results in hydrochloric acid being given off from the tri-monochloroethyl phosphate and in turn breaking down the cellulose acetate. The breakdown products render the plastic unusable in any commercial molding or extrusion process, as the hydrochloric acid rapidly corrodes the mold. In addition, the odor from the breaking-down plastic is very objectionable to the operators of the molding machine.

Large amounts of stabilizing salts, such as antimony oxide or magnesium carbonate, can be used successfully to stabilize cellulose acetate compositions containing tri - monochloroethyl phosphate, but they render the plastic a dense, white material, which greatly restricts its use. For some purposes, such, for instance, as the manufacture of specially shaped and colored light bulbs for ornamental purposes, it is desirable to have a highly translucent plastic, which can be molded, particularly by the injection molding process, and which is self-extinguishing if ignited. Such light bulbs and similar ornamental objects are commonly used in close proximity to highly inflammable material, such as paper, cloth, and evergreen branches, and it is highly important that the plastic should not contribute further flammability to the decorative ensemble.

We have discovered that a completely self-extinguishing, highly translucent cellulose acetate plastic, which can be injection molded or dry-extruded without discoloration or physical breakdown, and which does not exude plasticizer under extreme conditions of heat and humidity, can be compounded by plasticizing 100 parts of cellulose acetate with from 20 to 70 parts of a mixture of plasticizers which includes from 17 to 50 parts of tri-monochloroethyl phosphate per 100 parts of cellulose acetate and incorporating in the composition approximately 2 to 5 parts, preferably 3 parts, of lead maleate per 100 parts of cellulose acetate. Lead maleate is unique as a stabilizer for such compositions in that such a small amount of it is required that the plastic is highly translucent. Two parts of lead maleate give a plastic which approaches borderline stability. Five parts gives as much stability as can be expected from this stabilizer, and additional amounts would serve no useful purpose. A plastic containing 5 parts of lead maleate per 100 parts of cellulose aceate is too dense for many applications, but can be used in some cases to insure maximum stability. The optimum concentration is 3 parts lead maleate per 100 parts of cellulose acetate for stability and maximum translucency.

The lead maleate which we prefer to use as a stabilizer is the so-called "normal" salt, in which one atom of lead is combined with maleic anhydride according to the formula

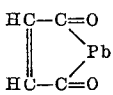

It is possible to combine 2 and 3 atoms of lead with maleic anhydride. We have tested these forms and found that they will function as stabilizers but impart higher density. The 3-atom combination also tends to give a yellow color to the plastic.

Flame resistance of the plastics is determined by A. S. T. M. Method D635-44, described in A. S. T. M. Standards, 1944, Part 3, page 527. The stability or resistance to breakdown on heating is measured by A. S. T. M. Method D569-48, described in A. S. T. M. Standards, 1948 Supplement, Part 3B, page 13. In this test the plastic is heated for one hour at 205° C. The flow should not break down more than one or two flows.

As examples of our novel compositions, we give the following formulas:

*Example I*

100 parts cellulose acetate
17 parts tri-monochloroethyl phosphate
20 parts triphenyl phosphate
5 parts diethyl phthalate
3 parts lead maleate This formulation gives a flow of H by A. S. T. M. tests. It is completely self-extinguishing, and can be made up in a variety of colors, by adding the dyes commonly used in cellulose acetate molding compositions. These formulations will go through the injection molding machine or dry extrusion equipment without discoloration or physical breakdown.

*Example II*

100 parts cellulose acetate
35 parts tri-monochloroethyl phosphate
3 parts dibutyl phthalate
3 parts lead maleate This composition has even greater flame resistance than that of Example I. It is more brittle than the composition of Example I, but it can be successfully injection molded.

These compositions have withstood conditions of 100° F. and 80% relative humidity for one month without exudation of plasticizer.

*Example III*

100 parts cellulose acetate
20 parts tri-monochloroethyl phosphate
20 parts triphenyl phosphate
3 parts lead maleate

*Example IV*

100 parts cellulose acetate
20 parts tri-monochloroethyl phosphate
20 parts ethyl diphenyl phosphate
3 parts lead maleate

*Example V*

100 parts cellulose acetate
25 parts tri-monochloroethyl phosphate
15 parts tricresyl phosphate
5 parts o- and p-toluene sulfonamides
3 parts lead maleate

*Example VI*

100 parts cellulose acetate
25 parts tri-monochloroethyl phosphate
15 parts methyl benzyl phthalate
3 parts lead maleate All parts in the specification and claims are by weight.

What we claim as our invention and desire to be secured by Letters Patent of the United States is:

1. A cellulose acetate composition which is translucent, self-extinguishing when ignited, and sufficiently stable at high temperatures to permit of being molded without decomposition of any of the components, comprising 100 parts by weight of cellulose acetate, from 20 to 70 parts of a mixture of plasticizers which includes from 17 to 50 parts of trimonochloroethyl phosphate, no plasticizer more flammable than cellulose acetate being present, and 3 parts of normal lead maleate.

2. A cellulose acetate composition which is translucent, self-extinguishing when ignited, and sufficiently stable at high temperatures to permit of being molded without decomposition of any of the components, comprising 100 parts by weight of cellulose acetate, 17 parts of tri-monochloroethyl phosphate, 20 parts of triphenyl phosphate, 5 parts of diethyl phthalate, and 3 parts of normal lead maleate.

3. A cellulose acetate composition which is translucent, self-extinguishing when ignited, and sufficiently stable at high temperature to permit of being molded without decomposition of any of the components, comprising 100 parts by weight of cellulose acetate, 35 parts of tri-monochloroethyl phosphate, 3 parts of dibutyl phthalate, and 3 parts of normal lead maleate.

LESTER W. A. MEYER.
WILLIAM M. GEARHART.

REFERENCES CITED

The following references are of record in the file of this patent:

UNITED STATES PATENTS

| Number | Name | Date |
| --- | --- | --- |
| 1,884,433 | Webb | Oct. 25, 1932 |
| 1,927,143 | Walsh | Sept. 19, 1933 |
| 2,328,269 | Gloor | Aug. 31, 1943 |
| 2,330,254 | Whitehead | Sept. 28, 1943 |
| 2,397,320 | Kock | Mar. 26, 1946 |